(12) United States Patent
Sai (10) Patent No.: US 10,994,368 B2
(45) Date of Patent: May 4, 2021

(54) WAFER FOR EXAMINATION AND EXAMINATION METHOD OF ENERGY DISTRIBUTION

(71) Applicant: DISCO CORPORATION, Tokyo (JP)

(72) Inventor: Seiichi Sai, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 206 days.

(21) Appl. No.: 16/107,585

(22) Filed: Aug. 21, 2018

(65) Prior Publication Data

US 2019/0061050 A1 Feb. 28, 2019

(30) Foreign Application Priority Data

Aug. 22, 2017 (JP) .................................. 2017-159263

(51) Int. Cl.
| | |
|---|---|
| *B23K 26/073* | (2006.01) |
| *B23K 26/03* | (2006.01) |
| *B23K 26/359* | (2014.01) |
| *B23K 26/06* | (2014.01) |

(52) U.S. Cl.
CPC ........ *B23K 26/032* (2013.01); *B23K 26/0648* (2013.01); *B23K 26/073* (2013.01); *B23K 26/359* (2015.10)

(58) Field of Classification Search
USPC ....................................................... 438/690
See application file for complete search history.

(56) References Cited

U.S. PATENT DOCUMENTS

| | | | | |
|---|---|---|---|---|
| 5,532,091 A | * | 7/1996 | Mizutani | G03F 9/7076 430/22 |
| 5,895,581 A | * | 4/1999 | Grunwald | C23F 1/02 216/13 |
| 8,728,933 B1 | * | 5/2014 | Andres | H01L 31/18 438/637 |
| 2005/0215986 A1 | * | 9/2005 | Chernyak | A61F 9/00802 606/5 |
| 2009/0314751 A1 | * | 12/2009 | Manens | H01L 31/03921 219/121.69 |
| 2011/0002514 A1 | * | 1/2011 | Youssefi | A61F 9/00814 382/128 |
| 2013/0328203 A1 | * | 12/2013 | Burgess | H01L 23/485 257/763 |
| 2014/0104600 A1 | * | 4/2014 | Rathjen | B23K 26/0624 356/123 |

(Continued)

FOREIGN PATENT DOCUMENTS

JP 2002192370 A 7/2002

*Primary Examiner* — Tu B Hoang
*Assistant Examiner* — Masahiko Muranami
(74) *Attorney, Agent, or Firm* — Greer, Burns & Crain, Ltd.

(57) ABSTRACT

There is provided a wafer for examination that is a wafer for examination with which energy distribution in a region of a light condensing spot of a laser beam with which irradiation is carried out from the upper surface side of a wafer is checked, and is a wafer for examination in which a first metal layer and a second metal layer different in specific heat or a melting point are formed over an upper surface of a wafer. In an examination method of energy distribution, the energy distribution of the laser beam is checked based on a processing mark formed in the first and second metal layers of the wafer for examination.

7 Claims, 4 Drawing Sheets

(56) References Cited

U.S. PATENT DOCUMENTS

2014/0251963 A1* 9/2014 Kawaguchi ............ B23K 26/08
219/121.73
2014/0288693 A1* 9/2014 Summerfield ............ G06T 7/74
700/166

* cited by examiner

IMAGED PROCESSING MARK PICTURE

FIG.3E

STORED PROCESSING MARK PICTURE

IMAGED PROCESSING MARK PICTURE

FIG.4D

STORED PROCESSING MARK PICTURE

WAFER FOR EXAMINATION AND EXAMINATION METHOD OF ENERGY DISTRIBUTION

BACKGROUND OF THE INVENTION

Field of the Invention

The present invention relates to a wafer for examination used in laser processing apparatus and an examination method of energy distribution.

Description of the Related Art

A surface of a wafer is segmented by plural planned dividing lines that intersect and a device is formed in each region obtained by the segmentation. As a dividing method of the wafer, a method in which the wafer is irradiated with a laser beam transmitted through the wafer and a modified layer along the planned dividing lines is formed inside the wafer is known (for example, refer to Japanese Patent No. 3408805). If the modified layer is formed inside the wafer, the wafer is divided into individual device chips in such a manner that the modified layer, at which the strength has been lowered, serves as the point of origin due to application of an external force by breaking or expanding. At this time, the dividing is possible although the width of the planned dividing lines is small because the processing width of the laser beam with which the irradiation is carried out is small.

SUMMARY OF THE INVENTION

Incidentally, the processing state of the modified layer formed inside the wafer changes according to the energy distribution at the light condensing spot of the laser beam when the modified layer is formed. That is, the degree of breaking of the wafer depends on the energy distribution of the laser beam at the light condensing spot. Therefore, if the energy distribution of the laser beam at the light condensing spot can be checked, the laser beam can be adjusted to obtain the optimum energy distribution. However, the light condensing spot inside the wafer is an extremely-small region whose diameter is 2 μm or smaller and therefore it is difficult to check the energy distribution at the light condensing spot. Thus, in the case of setting the same processing condition among plural pieces of apparatus or in the case in which a laser oscillator, laser beam optical system, or the like is replaced, it is impossible to reproduce the same processing result among the plural pieces of apparatus, or between before and after the replacement of the laser beam optical system, or the like.

Thus, an object of the present invention is to provide a wafer for examination and an examination method of energy distribution that allow the energy distribution at a light condensing spot to be checked in a pseudo manner by a simple configuration.

In accordance with an aspect of the present invention, there is provided a wafer for examination with which energy distribution in a region of a light condensing spot of a laser beam with which irradiation is carried out from the upper surface side of a wafer is checked. The wafer for examination includes a first metal layer and a second metal layer that are formed over an upper surface of a wafer and are different in specific heat or a melting point.

According to this configuration, due to irradiation of the wafer for examination with the laser beam, the energy distribution of the laser beam appears as a processing mark having a step shape in the region of the irradiation spot in the upper surface of the wafer for examination based on the difference in the specific heat or the melting point between the first and second metal layers of a two-layer structure. Thus, from the processing mark in the upper surface of the wafer for examination, the energy distribution in the region of the light condensing spot inside the wafer can be checked in a pseudo manner. Furthermore, variation in the processing result from apparatus to apparatus can be eliminated by checking the processing mark in the upper surface of the wafer for examination and adjusting the energy distribution of the laser beam. Moreover, even when part of the apparatus is replaced, laser processing before the replacement can be reproduced.

In accordance with another aspect of the present invention, there is provided an examination method of energy distribution in which energy distribution in a region of a light condensing spot of a laser beam with which irradiation is carried out from the upper surface side of a wafer is checked by using a wafer for examination in which a first metal layer and a second metal layer different in specific heat or a melting point are formed over an upper surface of a wafer. The examination method of energy distribution includes a holding step of holding the wafer for examination by a holding table in such a manner that the first and second metal layers are set on the upper side, a laser beam irradiation step of carrying out irradiation with the laser beam from the upper side of the wafer for examination and processing the first and second metal layers in an irradiation spot region obtained by enlarging the region of the light condensing spot, and an imaging step of imaging a processing mark arising from the processing in the laser beam irradiation step from the upper side.

Preferably, the examination method of energy distribution further includes an adjustment step of adjusting the energy distribution of the laser beam in the region of the light condensing spot in such a manner that an imaged processing mark picture obtained by the imaging in the imaging step becomes the same as a stored processing mark picture stored in advance through irradiating the wafer for examination with a laser beam that enables optimum laser processing and imaging a processing mark arising from processing in the irradiation spot region.

According to the present invention, the energy distribution of the laser beam appears as the processing mark having a step shape in the irradiation spot region in the upper surface of the wafer for examination based on the difference in the specific heat or the melting point between the first and second metal layers of a two-layer structure. Thus, from the processing mark formed in the upper surface of the wafer for examination, the energy distribution in the region of the light condensing spot inside the wafer can be checked in a pseudo manner.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
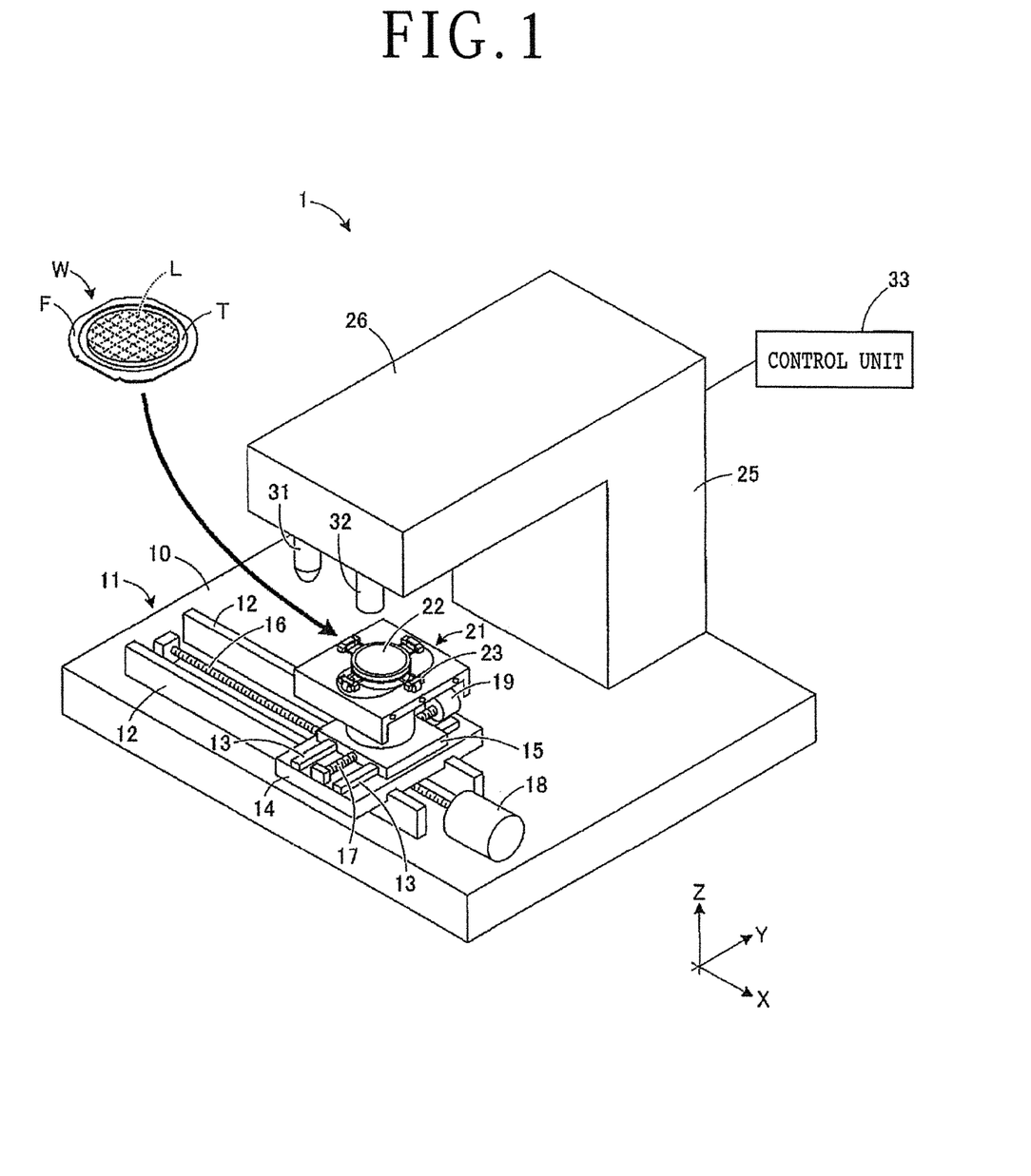
FIG. 1 is a perspective view of laser processing apparatus of the present embodiment.

Laser processing apparatus of the present embodiment will be described below with reference to the accompanying drawings. FIG. 1 is a perspective view of the laser processing apparatus of the present embodiment. It suffices for the laser processing apparatus to have a configuration that can carry out examination by use of a wafer for examination in the present embodiment and the laser processing apparatus is not limited to the configuration depicted in FIG. 1.

As depicted in FIG. 1, laser processing apparatus 1 is configured to cause relative movement of a laser processing unit 31 that carries out irradiation with a laser beam and a holding table 21 that holds a wafer W and carry out laser processing of the wafer W. Plural planned dividing lines L are arranged in a lattice manner on the front surface of the wafer W and plural devices are formed in the respective regions marked out by the planned dividing lines L. The wafer W is supported by a ring frame F with the intermediary of a dicing tape T. The wafer W is not particularly limited and it suffices for the wafer W to be an object in which a modified layer is formed by irradiation with a laser beam.

On a base 10 of the laser processing apparatus 1, a table movement unit 11 that moves the holding table 21 in X-axis direction and Y-axis direction relative to the laser processing unit 31 is provided. The table movement unit 11 has a pair of guide rails 12 that are disposed on the base 10 and are parallel to the X-axis direction and a motor-driven X-axis table 14 slidably set on the pair of guide rails 12. Furthermore, the table movement unit 11 has a pair of guide rails 13 that are disposed on the upper surface of the X-axis table 14 and are parallel to the Y-axis direction and a motor-driven Y-axis table 15 slidably set on the pair of guide rails 13.

A nut part, which is not depicted in the diagram, is formed on the both rear surface sides of the X-axis table 14 and the Y-axis table 15, and ball screws 16 and 17 are screwed to these nut parts. Furthermore, drive motors 18 and 19 joined to one-end parts of the ball screws 16 and 17 are rotationally driven and thereby the holding table 21 is moved in the X-axis direction and the Y-axis direction along the guide rails 12 and 13. Moreover, the holding table 21 that holds the wafer W is provided over the Y-axis table 15. A holding surface 22 is formed in the upper surface of the holding table 21 and clamp parts 23 that clamp and fix the ring frame F around the wafer W are provided around the holding table 21.

An arm part 26 is provided in a protruding manner on an upright wall part 25 on the rear side of the holding table 21 and the laser processing unit 31 that carries out laser processing of the wafer W on the holding table 21 is provided at the tip of the arm part 26. The laser processing unit 31 carries out irradiation with a laser beam having such a wavelength as to be transmitted through a substrate forming the wafer W from the back surface side of the wafer W. The holding table 21 is moved in the X-axis direction and the Y-axis direction relative to the laser processing unit 31. Thereby, the laser beam is condensed inside the wafer W and a modified layer M (see FIG. 3C) along the planned dividing lines L is formed. The wafer W is divided into individual device chips by employing this modified layer M, at which the strength has been lowered, as the point of origin of the dividing.

Furthermore, an imaging unit 32 for alignment of the wafer W is provided adjacent to the laser processing unit 31. The imaging unit 32 images the front surface of the wafer W to generate a captured image, and is used for an examination method using a wafer WA for examination (see FIG. 2) to be described later besides alignment of the wafer W. The modified layer M refers to a region in which the density, refractive index, mechanical strength, or another physical property inside the wafer W has become a different state from the surroundings due to irradiation with the laser beam and the strength has been lowered relative to the surroundings. Furthermore, the modified layer M is a melting treatment region, crack region, dielectric breakdown region, refractive index change region, for example, and may be a region in which these regions exist in a mixed manner.

Moreover, the laser processing apparatus 1 is provided with a control unit 33 that carries out overall control of the respective units of the apparatus. The control unit 33 is composed of a processor that executes various kinds of processing, a memory, and so forth. The memory is composed of one or plural storage media such as read only memory (ROM) and random access memory (RAM) according to the use purpose. In the memory, besides a control program to control the respective units of the apparatus, the processing condition of laser processing, a program to execute each step carried out in the examination method of the wafer WA for examination, and so forth are stored. Details of the wafer WA for examination will be described later.

Incidentally, the processing condition of laser processing is set based on the track record of processing for the wafer W and so forth. However, the optimum condition is not necessarily set regarding all pieces of laser processing apparatus 1. Even with the same type of laser processing apparatus 1, slight variation is caused from apparatus to apparatus in the output power characteristic of the laser beam. The processing status of the modified layer M in the wafer W differs due to this variation in the output power characteristic and difference is generated from apparatus to apparatus in how the wafer W is broken. In particular, when a component such as a laser oscillator or laser beam optical system is replaced, the same energy distribution of the laser beam as that before the replacement is not obtained and the possibility of deterioration of the processability also exists.

If the energy distribution of the laser beam at the light condensing spot inside the wafer W can be checked, the variation in the output power characteristic (energy distribution) of the laser beam can be corrected for each piece of apparatus. However, the light condensing spot is an extremely-small region whose spot diameter (diameter) is 2 µm or smaller and therefore it is difficult to check the energy distribution at the light condensing spot. Then, in the present embodiment, the wafer WA for examination including a metal layer that can absorb a laser beam at the upper surface of the wafer when irradiation with the laser beam having such a wavelength as to be transmitted through the wafer W is carried out is used and the metal layer is processed in an irradiation spot region in which the metal layer is irradiated with the laser beam that is not condensed. From a processing mark formed in the upper surface, the energy distribution of the region of the light condensing spot inside the wafer W can be enlarged in the upper surface of the wafer WA for examination and be checked in a pseudo manner.

Figure 2:
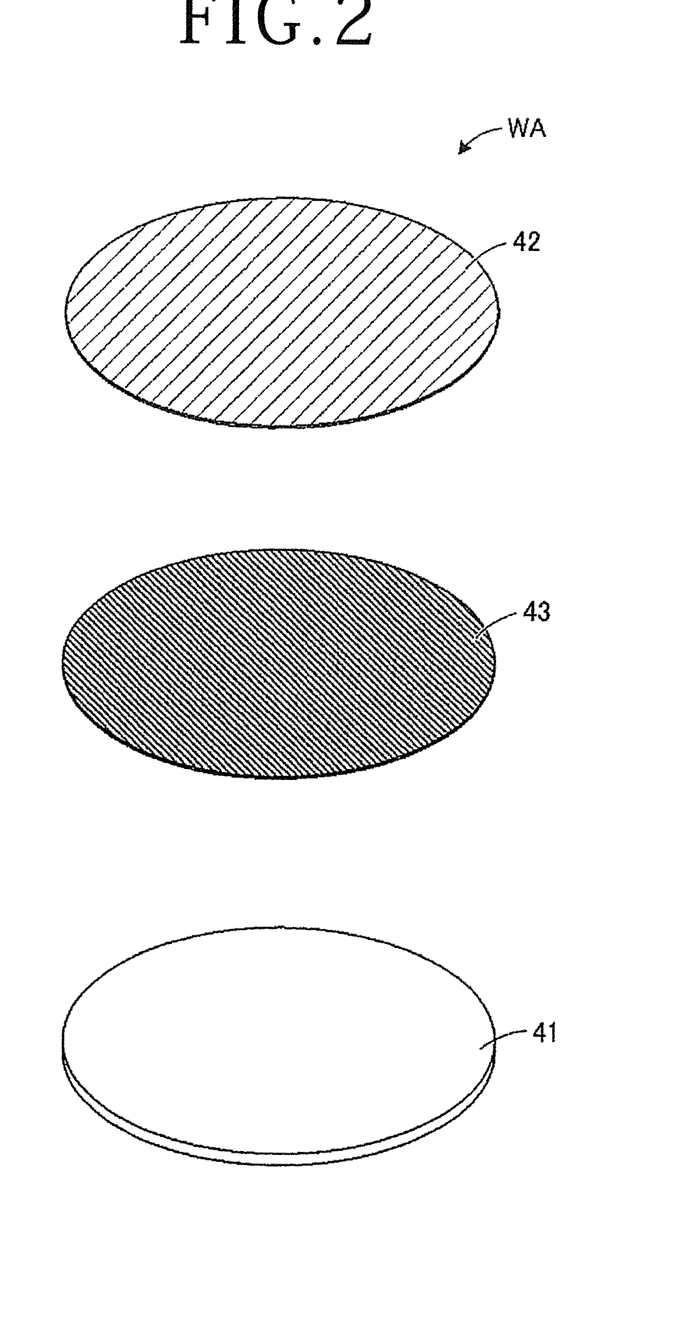
FIG. 2 is an exploded perspective view of a wafer for examination in the present embodiment.

With reference to FIG. 2, the wafer for examination in the present embodiment will be described below. FIG. 2 is an exploded perspective view of the wafer for examination in the present embodiment. As depicted in FIG. 2, when the processing condition of the laser processing apparatus 1 (see FIG. 1) is adjusted, the wafer WA for examination is used instead of the wafer W. The wafer WA for examination is configured to form a processing mark in an irradiation spot region by irradiation with a laser beam and examine the energy distribution of the laser beam from the processing mark. Over the upper surface of a substrate 41 for examination in the wafer WA for examination, two metal layers of first and second metal layers 42 and 43 are stacked in increasing order of the specific heat from the upper side. The first metal layer 42 is formed of a metal having lower specific heat and the second metal layer 43 is formed of a metal having higher specific heat than the first metal layer 42 under the first metal layer 42. Furthermore, regarding the formation of the metal layers, the two metal layers of the first and second metal layers 42 and 43 do not have to be stacked in increasing order of the specific heat from the upper side and may be formed to be stacked in decreasing order of the melting point from the lower side.

The first and second metal layers 42 and 43 are subjected to ablation processing in the irradiation spot region irradiated with a laser beam having such a wavelength as to be transmitted through the wafer W at the time of actual production, i.e. a laser beam for stealth dicing (SD) processing, and the energy distribution of the irradiation spot region is examined from a processing mark of the first and second metal layers 42 and 43. The ablation refers to the following phenomenon. When the irradiation intensity of the laser beam becomes a predetermined processing threshold or higher, a solid surface is converted to thermal, photochemical, and mechanical energy. As a result, neutral atoms, molecules, positive and negative ions, radicals, clusters, electrons, and light are explosively discharged and the solid surface is etched.

Various materials can be used for the substrate 41 for examination. As the substrate 41 for examination, a silicon (Si) substrate, silicon carbide (SiC) substrate, sapphire ($Al_2O_3$) substrate, or the like that is the processing target at the time of actual production may be used. The specific heat of silicon is approximately 700 J/kg° C. The specific heat of silicon carbide is approximately 670 J/kg° C. The specific heat of sapphire is approximately 750 J/kg° C. By using a material having high specific heat as the substrate 41 for examination, thermal deformation at the time of laser processing is prevented.

The second metal layer 43 having a predetermined thickness is formed by evaporation on the whole upper surface of the substrate 41 for examination. Various materials can be used for the second metal layer 43, and a material that is melted or thermally deformed by the laser beam at the time of actual production is used. As the second metal layer 43, titanium (Ti), chromium (Cr), nickel (Ni), aluminum (Al), or the like may be used. The specific heat of titanium is approximately 528 J/kg° C. and the specific heat of chromium is approximately 461 J/kg° C. It is also possible to use a material having lower specific heat as the second metal layer 43. In this case, a sufficient thickness is necessary. That is, it is preferable for the second metal layer 43 to be formed with a configuration less susceptible to the influence of the laser beam than the first metal layer 42.

The first metal layer 42 is formed by evaporation on the whole upper surface of the second metal layer 43. Various materials can be used for the first metal layer 42, and a material that is completely removed or carbonized by the laser beam at the time of actual production is used. As the first metal layer 42, tin (Sn), platinum (Pt), gold (Au), silver (Ag), indium (In), or lead (Pb) may be used. The specific heat of tin is approximately 226 J/kg° C. The specific heat of platinum is approximately 134 J/kg° C. The specific heat of gold is approximately 130 J/kg° C. The specific heat of silver is approximately 234 J/kg° C. The specific heat of indium is approximately 239 J/kg° C. The specific heat of lead is approximately 130 J/kg° C.

The specific heat and the melting point are depicted in the following table.

| | Material | Specific heat (J/kg° C.) | Melting point (° C.) |
| --- | --- | --- | --- |
| First metal layer | Tin | 226 | 231.9 |
| | Platinum | 134 | 1773.5 |
| | Gold | 130 | 1063 |
| | Silver | 234 | 960 |
| | Indium | 239 | 156.4 |
| | Lead | 130 | 327.4 |
| Second metal layer | Titanium | 528 | 1668 |
| | Chromium | 461 | 1890 |
| | Nickel | 461 | 1455 |
| | Aluminum | 905 | 660.3 |
| Substrate for examination | Silicon | 740 | 1414 |
| | Silicon carbide | 678 | 2730 |
| | Sapphire | 750 | 2040 |

As above, in the wafer WA for examination, the first and second metal layers 42 and 43 are stacked in decreasing order of the specific heat from the lower side. The laser beam having such a wavelength as to be transmitted through the wafer W (see FIG. 1) at the time of actual production has such a wavelength as to be absorbed by the first and second metal layers 42 and 43. Thus, the first metal layer 42 is removed by irradiation with the laser beam. The second metal layer 43 is less susceptible to the influence of the energy of the laser beam than the first metal layer 42. Therefore, the first metal layer 42 is removed or carbonized and the second metal layer 43 is partly exposed in the irradiation spot region of the laser beam. That is, at the irradiation spot of the wafer WA for examination, a processing mark is formed with the part at which the first metal layer 42 has been carbonized and the part at which the first metal layer 42 has been removed and the second metal layer 43 is partly exposed.

Based on the shape and pattern of the processing mark of the wafer WA for examination, the energy distribution of the laser beam in the irradiation spot region can be checked and the processing condition of the laser processing can be adjusted to cause the processing mark to become the same as an ideal processing mark. At this time, due to the adjustment of the energy distribution in the irradiation spot region, the energy distribution of the region of the light condensing spot inside the wafer W at the time of actual production is adjusted in a pseudo manner. Thus, the output power characteristic of the laser beam involving variation from apparatus to apparatus can be brought close to the optimum characteristic. Although the configuration in which the first and second metal layers 42 and 43 are formed by evaporation is employed, the first and second metal layers 42 and 43 may be formed by any method as long as they can be stacked with a two-layer structure for the wafer WA for examination.

Next, the examination method of energy distribution will be described with reference to FIG. 3A to FIG. 3E. FIG. 3A to 3E are explanatory diagrams of the examination method of energy distribution in the present embodiment. FIG. 3A, FIG. 3B, FIG. 3C, and FIG. 3D are diagrams depicting one example of a holding step, a laser beam irradiation step, an imaging step, and an adjustment step, respectively. Furthermore, FIG. 3 depicts one example of the examination method of energy distribution and change can be made as appropriate.

Figure 3A:
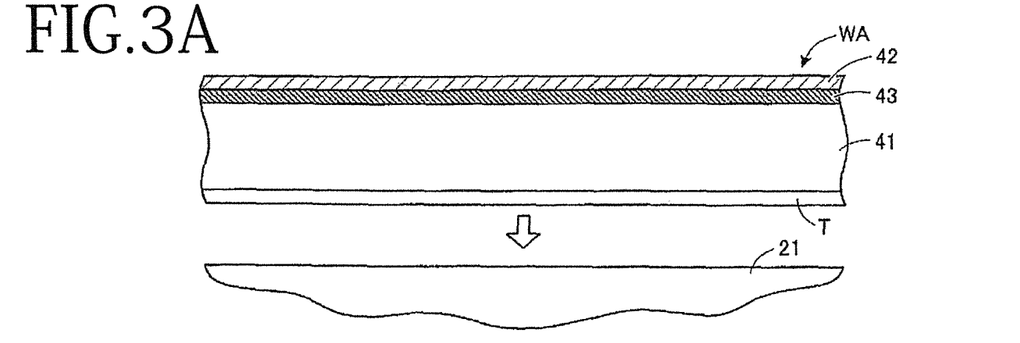
FIG. 3A to FIG. 3E are explanatory diagrams of an examination method of energy distribution in the present embodiment.

As depicted in FIG. 3A, the holding step is carried out first. In the holding step, similarly to the wafer W at the time of actual production, the wafer WA for examination is supported by the ring frame F (see FIG. 1) with the intermediary of the dicing tape T and is held by the holding table 21 in the state of being supported by the ring frame F. At this time, the wafer WA for examination is held by the holding table 21 with the intermediary of the dicing tape T, with the first and second metal layers 42 and 43 set on the upper side, and the ring frame F around the wafer WA for examination is held by the clamp parts 23 (see FIG. 1). The wafer WA for examination does not have to be supported by the ring frame F and may be held with only the holding table 21.

Figure 3B:
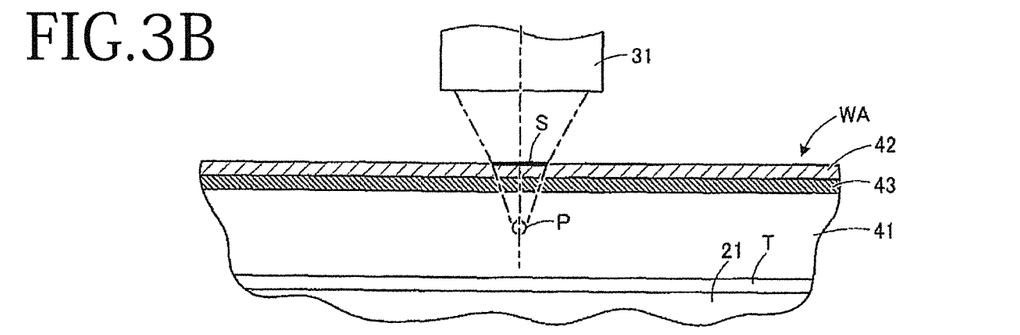

As depicted in FIG. 33, the laser beam irradiation step is carried out after the holding step. In the laser beam irradiation step, the wafer WA for examination is positioned directly below the emission port of the laser processing unit 31 and a region P of a light condensing spot of a laser beam is positioned inside the wafer WA for examination by the laser processing unit 31. Irradiation with the laser beam is carried out from the upper side of the wafer WA for examination by the laser processing unit 31 and the first and second metal layers 42 and 43 are processed in an irradiation spot region S obtained by enlarging the region P of the light condensing spot in the upper surface of the wafer WA for examination. At this time, the wavelength of the laser beam has been adjusted to such a wavelength as to be transmitted through the wafer W at the time of actual production and has become such a wavelength as to be absorbed by the first and second metal layers 42 and 43.

As described above, the specific heat of the second metal layer 43 is higher than the first metal layer 42. Therefore, the first metal layer 42 is wholly removed and the surface of the second metal layer 43 is partly removed in the irradiation spot region S in the upper surface of the wafer WA for examination (see FIG. 3C). Only the first metal layer 42 is removed at places at which the output power of the laser beam is weak, whereas removal is deeply made until the second metal layer 43 at places at which the output power of the laser beam is strong. The energy distribution that depicts the strength of the output power of the laser beam appears as a processing mark 45 (see FIG. 3C) in the upper surface of the wafer WA for examination. This makes it possible to check the energy distribution of the laser beam in the irradiation spot region S based on the processing mark 45.

Figure 3C:
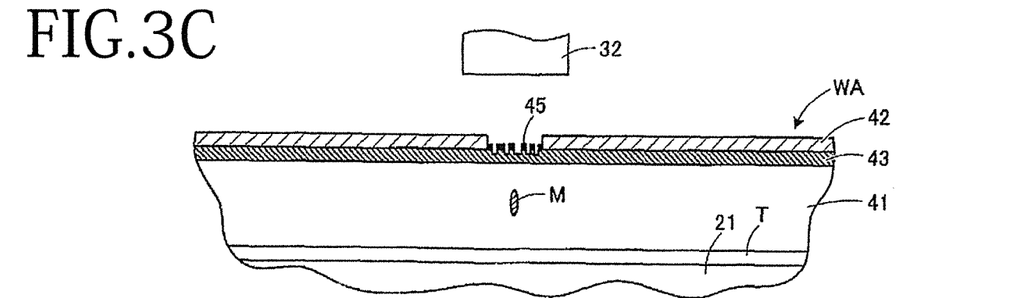

As depicted in FIG. 3C, the imaging step is carried out after the laser beam irradiation step. In the imaging step, the processing mark 45 of the wafer WA for examination is positioned in the imaging range of the imaging unit 32 and the processing mark 45 of the wafer WA for examination is imaged from the upper side by the imaging unit 32. When the processing mark 45 is imaged by the imaging unit 32, a captured image of the processing mark 45 is output from the imaging unit 32 to the control unit 33 (see FIG. 1). In the control unit 33, the captured image of the processing mark 45 is stored in a memory as an imaged processing mark picture. In the control unit 33, a captured image obtained by irradiating the wafer WA for examination with a laser beam that enables optimum laser processing and imaging the processing mark 45 of the irradiation spot region S in advance is stored in the memory as a stored processing mark picture as depicted in FIG. 3E.

Figure 3D:
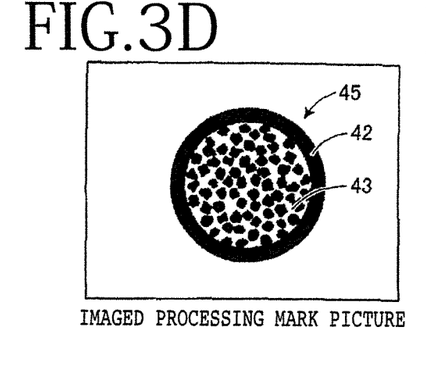
Figure 3E:
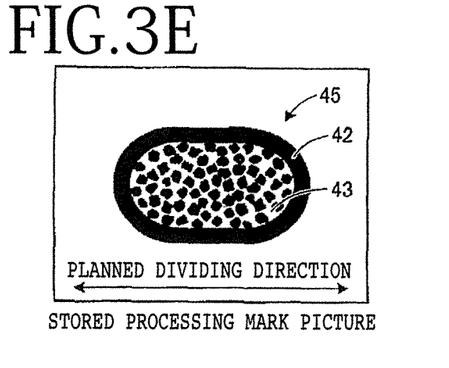

As depicted in FIG. 3D, the adjustment step is carried out after the imaging step. In the adjustment step, the imaged processing mark picture that is obtained by imaging in the imaging step and is depicted in FIG. 3D and the stored processing mark picture that is obtained by imaging in advance and is depicted in FIG. 3E are displayed on a monitor of the laser processing apparatus 1 (see FIG. 1) by the control unit 33. A circular processing mark is displayed in the imaged processing mark picture and an elliptical processing mark whose long axis is oriented in the planned dividing direction is displayed in the stored processing mark picture. In the imaged processing mark picture and the stored processing mark picture, the first metal layer 42 has been carbonized (for example, tin carbide) and is displayed in black mainly at the outer edge of the processing mark 45 and the second metal layer 43 (for example, titanium) is exposed from gaps made here and there inside the outer edge and is displayed in white.

In the above-described embodiment, a processing mark in which the first metal layer 42 has been carbonized is taken as an example. However, the processing mark may be a processing mark in which the first metal layer 42 has not reached carbonization but has been altered. Moreover, in the above-described embodiment, the example in which the processing mark is displayed in black and white on the monitor is employed. However, a processing mark in which the first metal layer 42 and the second metal layer 43 have been altered may be displayed in colors on the monitor with the hue or light and shade (contrast) of the colors.

Furthermore, the energy distribution in the irradiation spot region S (see FIG. 3B) is adjusted to cause the imaged processing mark picture to become the same as the stored processing mark picture. The energy distribution in the irradiation spot region S is adjusted by a beam expander. Furthermore, the energy distribution may be adjusted by using a spatial light modulator liquid crystal on siliconspatial light modulator (LCOS-SLM). Moreover, by repeating the respective steps from the laser beam irradiation step to the adjustment step for the wafer WA for examination, the outer edge shape of the imaged processing mark picture is brought closer to the elliptical shape of the stored processing mark picture. In addition, the color state of the inside of the outer edge of the imaged processing mark picture based on the hue or light and shape of colors is brought closer to the color state of the inside of the outer edge of the stored processing mark picture based on the hue or light and shape of colors.

In this manner, the energy distribution of the irradiation spot of the laser beam is adjusted while the processing mark 45 in the upper surface of the wafer WA for examination is checked. Furthermore, due to the adjustment of the energy distribution of the irradiation spot region S in the upper surface of the wafer WA for examination, the energy distribution of the region P of the light condensing spot is indirectly adjusted inside the wafer. Therefore, due to the approximation of the imaged processing mark picture to the stored processing mark picture, the energy distribution in the region P of the light condensing spot of the laser beam is adjusted to the optimum energy distribution for the wafer W at the time of actual production. The wafer W is irradiated with the laser beam after the adjustment and actual production is carried out. Thereby, the modified layer is favorably formed inside the wafer W and the divisibility is improved.

As described above, according to the wafer WA for examination in the present embodiment, due to irradiation with the laser beam, the energy distribution of the laser beam appears as the processing mark 45 having a step shape in the region of the irradiation spot in the upper surface of the wafer WA for examination based on the difference in the specific heat between the first and second metal layers 42 and 43 of the two-layer structure. Thus, from the processing mark 45 in the upper surface of the wafer WA for examination, the energy distribution in the region P of the light condensing spot inside the wafer W can be checked in a pseudo manner. Furthermore, variation in the processing result from apparatus to apparatus can be eliminated by checking the processing mark 45 in the upper surface of the wafer WA for examination and adjusting the energy distribution of the laser beam. Moreover, even when part of the apparatus is replaced, laser processing before the replacement can be reproduced.

Figure 4A:
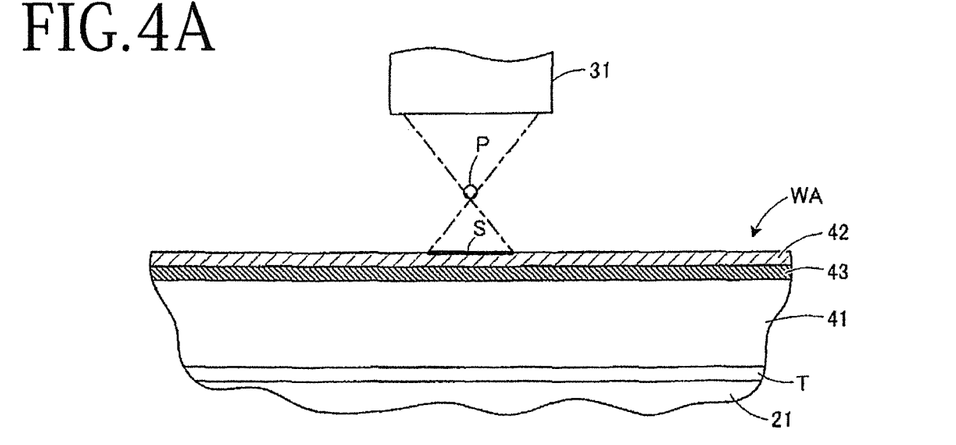
FIG. 4A to FIG. 4D are explanatory diagrams of a modification example of the examination method of energy distribution.

Furthermore, in the present embodiment, the configuration is employed in which, in the laser beam irradiation step, irradiation with a laser beam is carried out in such a manner that the region of the light condensing spot of the laser beam is positioned inside the wafer for examination. However, the present invention is not limited to this configuration. It suffices for the laser beam irradiation step to have a configuration in which irradiation with a laser beam is carried out from the upper side of the wafer for examination and the metal layers are processed in the irradiation spot region S. Thus, as depicted in FIG. 4A, the region P of the light condensing spot of the laser beam with which irradiation is carried out by the laser processing unit 31 may be positioned above the wafer WA for examination and the first and second metal layers 42 and 43 may be processed in the irradiation spot region S of the laser beam with which the upper surface of the first metal layer 42 is irradiated in a wider region than the region P of the light condensing spot.

Figure 4B:
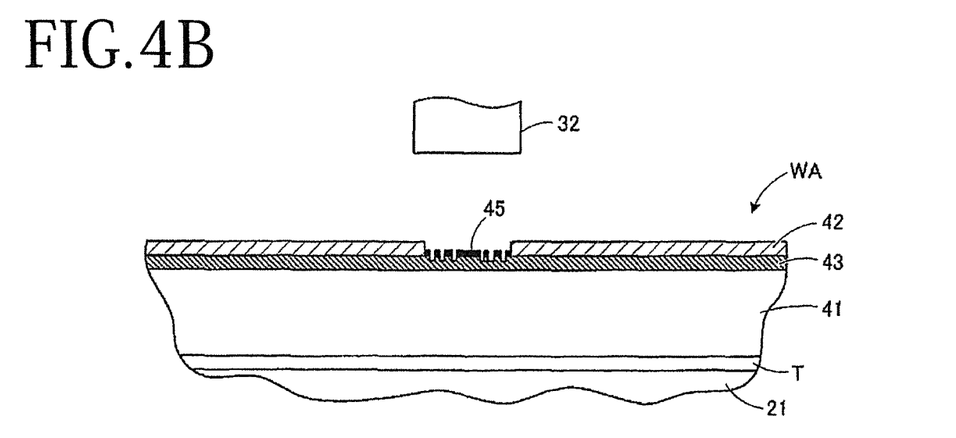
Figure 4C:
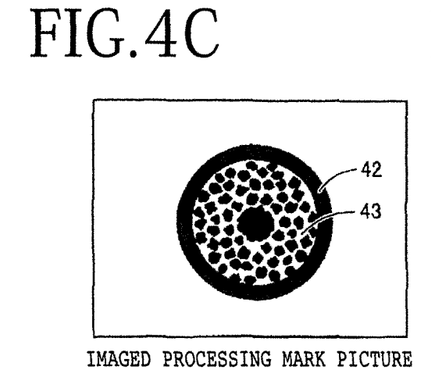
Figure 4D:
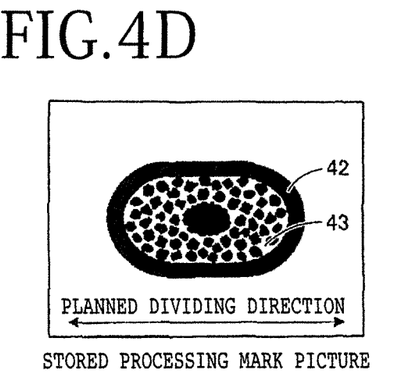

As depicted in FIG. 4B, in the upper surface of the wafer WA for examination, the first metal layer 42 is wholly removed and the surface of the second metal layer 43 is partly melted or removed. The energy distribution that depicts the strength of the output power of the laser beam appears as the processing mark 45 in the upper surface of the wafer WA for examination. This makes it possible to check the energy distribution of the laser beam in the irradiation spot region S based on the processing mark 45. In this case, as depicted in FIG. 4C, in an imaged processing mark picture, the first metal layer 42 has been carbonized and is displayed in black mainly at the outer edge and center of the processing mark 45, and the second metal layer 43 is exposed from gaps made here and there in the region other than the outer edge and the center and is displayed in white when the second metal layer 43 is titanium, for example. Also with this configuration, variation in the processing result from apparatus to apparatus can be eliminated by adjusting the energy distribution of the laser beam in the irradiation spot region S to cause the imaged processing mark picture to become the same as a stored processing mark picture depicted in FIG. 4D.

Furthermore, in the present embodiment, the configuration is employed in which the examination method of energy distribution has the adjustment step of adjusting the energy distribution of the laser beam. However, the present invention is not limited to this configuration. It suffices for the examination method of energy distribution to allow at least the check of the energy distribution in the irradiation spot region from a processing mark formed in the wafer for examination, and the examination method of energy distribution does not have to include the adjustment step.

Moreover, in the present embodiment, the first and second metal layers are formed over the whole surface of the substrate for examination. However, the present invention is not limited to this configuration. It suffices for the first and second metal layers to be stacked over the substrate for examination in decreasing order of the specific heat or the melting point from the lower side, and the first and second metal layers may be partly formed with respect to the substrate for examination.

In addition, in the present embodiment, the configuration is employed in which the holding step, the laser beam irradiation step, the imaging step, and the adjustment step are carried out in the laser processing apparatus. However, the present invention is not limited to this configuration. The holding step, the laser beam irradiation step, the imaging step, and the adjustment step may be each carried out by dedicated apparatus.

Furthermore, the present embodiment, description is made with exemplification of the laser processing apparatus that carries out laser processing of a wafer as processing apparatus. However, the present invention is not limited to this configuration. The present invention may be applied to cluster apparatus obtained by combining laser processing apparatus and another piece of processing apparatus.

Moreover, as the wafer of the processing target, various kinds of works such as semiconductor device wafer, optical device wafer, package substrate, semiconductor substrate, inorganic material substrate, oxide wafer, green ceramic substrate, and piezoelectric substrate, for example, may be used according to the kind of processing. As the semiconductor device wafer, a silicon wafer or compound semiconductor wafer after formation of devices may be used. As the optical device wafer, a sapphire wafer or silicon carbide wafer after formation of devices may be used. Furthermore, a chip size package (CSP) substrate may be used as the package substrate. Silicon, gallium arsenide, or the like may be used as the semiconductor substrate. Sapphire, ceramics, glass, or the like may be used as the inorganic material substrate. Moreover, as the oxide wafer, lithium tantalate or lithium niobate after formation of devices or before formation of devices may be used.

Furthermore, embodiments and modification examples of the present invention are not limited to the above-described embodiment and may be variously changed, replaced, and modified without departing from the gist of technical ideas of the present invention. Moreover, if a technical idea of the present invention can be implemented in another way based on the progress of a technique or another technique that is derivative, the technical idea may be carried out by using the method. Therefore, the scope of claims covers all embodiments that can be included in the range of the technical ideas of the present invention.

Moreover, although the configuration in which the present invention is applied to a wafer for examination is described in the present embodiment, it is possible to apply the present invention to a workpiece regarding which a processing condition that enables favorable dividing based on a modified layer can be found.

As described above, the present invention has an effect that the energy distribution at a light condensing spot can be checked in a pseudo manner by a simple configuration and is useful particularly for a wafer for examination and an examination method of energy distribution for adjustment of the energy distribution of a laser beam to a semiconductor wafer or optical device wafer.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An examination method of energy distribution in which energy distribution in a region of a light condensing spot of a laser beam with which irradiation is carried out from an upper side of an upper surface of a wafer is checked by using a wafer for examination in which a first metal layer and a second metal layer different in specific heat or a melting point are formed over the upper surface of the wafer, the examination method of energy distribution comprising:

a holding step of holding the wafer for examination by a holding table in such a manner that the first and second metal layers are set on the upper side;

a laser beam irradiation step of carrying out irradiation with the laser beam from the upper side of the wafer for examination and a processing by ablation of the first and second metal layers in an irradiation spot region obtained by enlarging the region of the light condensing spot;

an imaging step of imaging a processing mark arising from the processing by ablation in the laser beam irradiation step from the upper side, wherein said processing mark is formed in the upper surface of the wafer such that a bottom surface of said processing mark is formed on an upper surface of the second metal layer and includes a portion of the first metal layer, which has been altered by the laser beam and a portion of the second metal layer; and comparing said processing mark to a stored processing mark to determine the energy distribution in said irradiation spot region on the upper side of the wafer and thereby determining the energy distribution in the region of the light condensing spot.

2. The examination method of energy distribution according to claim 1, further comprising:

an adjustment step of adjusting the energy distribution of the laser beam in the region of the light condensing spot in such a manner that an imaged processing mark picture obtained by the imaging in the imaging step becomes same in size as a stored processing mark picture stored in advance through irradiating the wafer for examination with a laser beam that enables optimum laser processing and imaging a processing mark arising from processing in the irradiation spot region.

3. The examination method of energy distribution according to claim 2, wherein said processing mark includes an outer edge of the first metal layer and a portion of said processing mark within said outer edge includes the second metal layer.

4. The examination method of energy distribution according to claim 2, wherein the adjustment step includes using a beam expander to adjust the energy distribution in the irradiation spot region.

5. The examination method of energy distribution according to claim 2, wherein the adjustment step includes using a spatial light modulator liquid crystal on silicon-spatial light modulator to adjust the energy distribution in the irradiation spot region.

6. The examination method of energy distribution according to claim 1, wherein the first metal layer has a first specific heat and the second metal layer has a second specific heat, wherein the first specific heat is lower than the second specific heat.

7. The examination method of energy distribution according to claim 1, wherein the first metal layer has a first specific heat and the second metal layer has a second specific heat, wherein the first specific heat is higher than the second specific heat.

* * * * *